United States Patent
Anderson

[15] 3,672,421
[45] June 27, 1972

[54] SNOW TIRE WITH RETRACTABLE STUDS

[72] Inventor: James R. Anderson, Minneapolis, Minn.

[73] Assignee: Research Incorporated, Minneapolis, Minn.

[22] Filed: May 15, 1970

[21] Appl. No.: 37,745

[52] U.S. Cl. .................................................. 152/208
[51] Int. Cl. ................................................. B60c 11/16
[58] Field of Search ...................................... 152/208

[56] References Cited

UNITED STATES PATENTS

| | | | |
|---|---|---|---|
| 3,516,466 | 6/1970 | Smit | 152/208 |
| 2,888,056 | 5/1959 | Zahlten | 152/208 |
| 3,095,918 | 7/1963 | Mike | 152/208 |
| 3,340,921 | 9/1967 | Garfinkle | 152/208 |
| 2,781,813 | 2/1957 | Ferguson | 152/208 |
| 2,941,566 | 6/1960 | Prince | 152/208 |

FOREIGN PATENTS OR APPLICATIONS

| | | | |
|---|---|---|---|
| 688,026 | 5/1930 | France | 152/208 |

Primary Examiner—Drayton E. Hoffman
Attorney—Dugger, Peterson, Johnson & Westman

[57] ABSTRACT

A tire, particularly for operation in icy conditions which has studs that are mounted so they can be retracted or extended pneumatically without changing the external configuration or shape of the tire, and can be extended without utilizing any external pressure sources.

4 Claims, 6 Drawing Figures

PATENTED JUN 27 1972

INVENTOR.
JAMES R. ANDERSON
BY
Dugger, Peterson, Johnson & Westman
Attorneys

INVENTOR.
JAMES R. ANDERSON
BY
Dugger, Johnson, Peterson & Westman
Attorneys

SNOW TIRE WITH RETRACTABLE STUDS

BACKGROUND OF THE INVENTION

1. Field of the Invention

The present invention has relation to tires, and more particularly to the extension and retraction of traction studs mounted in the tires.

2. Prior Art

In the prior art, there have been tires that have utilized studs or projections that extend beyond the normal tread of the tire to give added traction. For example, U.S. Pat. No. 2,217,122 discloses a tire which has lugs or studs that can be projected from the exterior surface of the tire when desired by inflating certain pockets in the tire and deflating other pockets to change the silouette of the tire so that the studs will project beyond the outer tread portion.

This involves therefore the changing of the cross sectional shape of the tire, giving different handling characteristics, and further requires the use of a pressure source to extend the studs because pockets in the tire have to be inflated in order to have the studs extended.

In recent years the use of studs has been increasing at a startling rate. Actually the studs are needed perhaps only 5 percent of the time, even in winter. However, the studded tires are left on the car all winter in cold areas, and the road damage from the studs has become an expensive problem.

SUMMARY OF THE INVENTION

The present invention relates to a tire structure which has extendable and retractable traction increasing studs wherein the studs can be extended quickly and easily for use when needed, and retracted for normal driving conditions even in winter. The studs therefore are used only when necessary and are usually retracted to minimize road surface damage. The present invention relates to a structure which permits the extension of the studs pneumatically, and without requiring a separate air source for extending the studs. This permits the use of the studs instantly and at any location when they are necessary. The unit is fail-safe so that if the means holding the studs retracted loses pressure, the studs will extend, and this means that if failure occurs the driver will have the traction advantage of a studded tire.

It is further disclosed that the number of studs can be altered as desired, and two forms of studs can be utilized. One is a staple type, and the other is a headed type, both of which are mounted on walls vulcanized on the inside of the tires, and with control tubes positioned so that when the tubes are inflated at a pressure greater than that of the interior tire pressure, the studs will be retracted, and when the control tubes are deflated to a pressure lower than that inside a tire, the studs will start to extend. The amount of stud extension can be controlled by the pressure differential between the stud control tubes, and the interior tire pressure.

Further the present invention includes the use of a valving arrangement to control stud extension from the driver's seat. As shown, an electromagnet mounted on the frame of the car can be energized by the driver to open a magnetically controlled valve controlling pressure in the stud control hoses each time the tire rotates, and then by adjusting the length of time the electromagnet is energized, and therefore the number of times that the valve is operated (it is operated once each revolution of the tire). The driver can automatically control the extension of the studs in his tires from the dashboard of the car.

It is therefore an object of the present invention to present a tire utilizing retractable traction increasing studs operable in response to air pressure. It is a further object to present a tire in which studs can be retracted and extended without changing the normal tire cross section.

It is a further object of the present invention to present extendable and retractable traction studs in combination with an automobile tire through the use of pressure differential actuation in a single wall tire casing.

It is a still further object of the present invention to present a tire having extendable and retractable studs wherein the amount of extension and retraction can be controlled and such control can be effected from the dashboard of an automobile.

It is a still further object of the present invention to present a tire having extendable and retractable studs that is easy to manufacture.

Other objects are inherent in the description and will be apparent as this description proceeds.

DESCRIPTION OF THE PREFERRED EMBODIMENT

Figure 1:
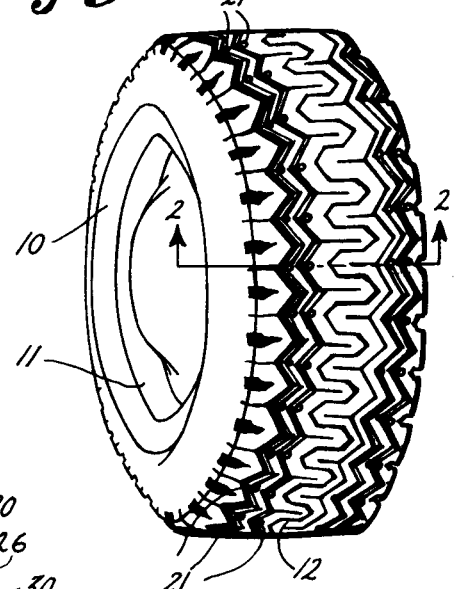
FIG. 1 is a perspective view of a tire showing a typical tread having extendable and retractable studs made according to the present invention and installed thereon.

Referring to FIG. 1, a snow tire illustrated generally at 10 is shown mounted onto a rim or wheel 11 that in turn is mounted onto an automobile in the usual manner. The tire 10 is formed of the usual casing and has a road engaging wall having a tread 12 that can be a snow grip tread, as that shown, or can be any desired tread that is wanted. The tire itself has the usual air inflation valve shown schematically at 13. The casing includes side walls 14, 14 joining the road engaging wall and of course the bead of the tire 15 that seats within the rim.

Adjacent the road engaging wall of the tire and on the interior, there is a multiple layer fluid tight barrier wall 16 that extends between the side walls 14, 14 and is sealingly vulcanized or joined to two of the interior surfaces of the side walls 14, 14 along annular lines indicated at 17, 17 on opposite sides of the tire adjacent the outer portions of the tire where the tread is formed. The barrier wall 16 divides the interior of the tire into two separated chambers. The barrier wall is formed, as shown, of at least two layers of material that can either be elastomeric, fabric reinforced elastomers, or some other type of synthetic or natural material that is fluid tight. The barrier wall is deflectable but somewhat rigid to distribute pressure forces. Several layers can be used to form the wall 16 if desired.

A plurality of individual staple type studs 20 are mounted to this barrier wall 16 and move therewith. The studs are made of suitable hard metal and are positioned on the barrier wall 16 so that they will align with a pass through provided openings 21 extending through the tread wall or tread portion of the tire to the exterior of the tire. Each of the stud staples 20 has a pair of legs 22, 22 forming the projecting stud means and a cross member or base member 23 that is held in the barrier wall 16. Between the legs 22, 22 of each of the staple studs 20, and positioned between the interior surface 24 of the road engaging tread wall of the tire and surface 25 of the barrier wall there is an air tight tube made up of several elastomeric or stretchable inflatable tube sections 26. The outer edge tube sections 26 are positioned annularly around the tire. The outer tube sections extend between the legs 22 of all of the studs that the tube section is aligned with. The legs 22 are positioned in annular rows, or can be offset slightly, so the tube sections have to snake back and forth slightly. The outer tube sections 26 are connected together with a center tube section 26A that, as shown, spirals around the interior of the tire between the outer tube sections 26. Cross tubes extending directly across the tire between the outer tube sections can be used for pneumatically connecting the outer tube sections 26, but the spiralled center section makes it easier to balance the tire. All of the studs are positioned so their legs are on opposite sides of one of the tube sections 26. The tube sections 26 thus extend around the tire to control all of the staple type studs.

The tube sections 26 and 26A are joined together with fluid communication between the interiors of each of the tube sections and they form a continuous tube assembly. A pressure valve illustrated generally at 30 will permit inflating the interior of all of the tube sections and consequently control the amount of inflation of the tube sections 26 for all of the studs. The barrier wall 16 forms an interior inflation chamber in the tire holding inflation pressure. The wall 16 could also be termed a bladder wall.

It should be noted that valve assembly 30 in the first form of the invention is positioned so it is not necessary to run any tube section through the barrier wall.

Figure 2:
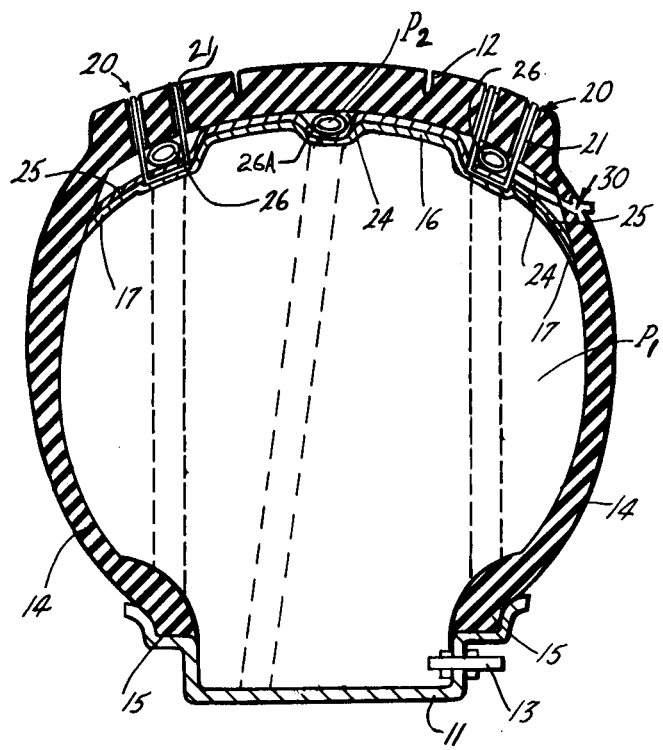
FIG. 2 is a sectional view taken as on line 2—2 in FIG. 1 showing a typical installation for the staple-type stud made according to the first form of the present invention with the studs retracted.

The valve assembly 30 can be of any usual or preferred type, which will permit inflation of the tube sections 26 and 26A so that the tube sections can expand into the configuration shown in FIG. 2. When the tube sections 26 are inflated to a pressure wherein the pressure inside of the main tire chamber between the side walls 14, and designated $P_1$ is less than the pressure on the interior of the tube sections, designated $P_2$, the barrier wall 16 will be pushed away from the surface 24 in these areas against the force from the tire inflation pressure, and at the same time the staple type studs will be moved inwardly. The legs 22, 22 of each of the studs will slide inwardly in their provided openings 21 until the tubes 26 reach the condition where they are expanded sufficiently to retract the studs the desired amount. If the tube sections are fully expanded the studs completely retract and the tire will merely run along its outer tread or road engaging surface without any stud action. The amount of retraction available will be selected to permit stud retraction even after normal tread wear. The barrier wall is limber enough to deflect without changing the tire casing profile.

When the valve 30 is opened to deflate all of the tube sections 26 and 26A, the pressure $P_1$ acts against the barrier wall, which has some stiffness to give a surface area on which the pressure $P_1$ acts to provide force to push the studs out.

Figure 3:
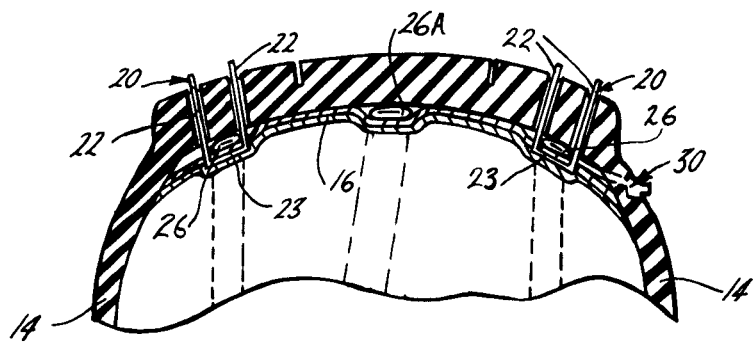
FIG. 3 is a sectional view of the device of FIG. 2 with the studs extended fully.

FIG. 3 shows all of the tube sections 26 and 26A collapsed flat, and this is after the valve 30 has been opened to fully deflate the tube sections. The legs 22 forming the stud means are fully extended for use.

It should be noted that by controlling the pressure $P_2$ in the tube sections 26 in relation to $P_1$, the pressure inside the main tire chamber, the size of the tube sections 26 can be controlled so that the amount of extension of the studs can be controlled. The studs can be made to just barely protrude beyond the tread of the tire, or protrude to their full extent as shown in FIG. 3. The tube sections 26 extending between the legs of the staple type studs insure that the studs will not pull out of the barrier wall 16 but will be actuated directly on their base members 23 when the tube sections are inflated for retraction. Again, the device is a fail-safe unit in that all that needs to be done when the studs are to be used is to deflate the tube sections 26, and no inflation is necessary. When the studs are to be retracted, a conventional service station pressure hose can be utilized for inflating the tube sections 26 and retracting the studs.

The valve 30 may be the usual tube valve type for manual deflating or may be of a special type, if desired, that can be actuated by a magnetic flux adjacent the valve. Several types of valves can be used, and for illustrative purposes a simple poppet valve that is spring loaded to its closed position with a slidably mounted flanged actuating disc at one end, and wherein the disc operates in a chamber and is spring loaded to closed position is shown schematically. The interior stem supporting the poppet valve is constructed like a conventional tire valve for inflation. The valve unit can be vulcanized in the side wall of the tire adjacent the thread wall as shown. The valve unit can be quite small. Then an electromagnet can be mounted on the auto frame portion 39 and positioned so that it will align with the path of movement of the valve as the tire rotates. When the electromagnet is energized it will create a magnetic flux that will act on the valve to pull the poppet away from its seat and let air escape from the tube sections 26.

Figure 4:
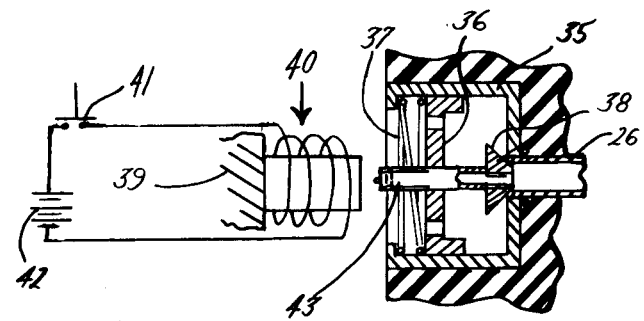
FIG. 4 is a schematic representation of an electromagnetic actuable control valve and energizing circuit.

As shown schematically in FIG. 4, a small housing 35 is utilized this housing is vulcanized into the tire wall and may have a plastic interior surface. A sliding flanged disc 36 is mounted inside the housing and is spring loaded with a spring 37 to force a poppet valve 38 against a seat connected to the end of tube sections 26. The spring 37 is sufficiently strong to keep the valve closed at maximum pressure in the tube sections 26. When the field of magnetic flux from the electromagnet indicated schematically at 40 acts on the disc 36, (which has at least portions thereof that are attracted by the electromagnet) the disc will slide toward the electromagnet against the action of the spring 37, and will pull the poppet away from the valve seat, to let air escape out through the poppet valve and through openings in disc 36 to atmosphere. Electromagnet 40 is mounted onto a frame section 39 of the car adjacent the tires (one on each side) and is controlled by a switch 41 mounted on the dashboard of a car and energized by the car battery 42. When the switch 41 is closed, the electromagnet is energized and each time the tire rotates past the electromagnet the poppet valve 38 would be pulled away from its seat for a short period of time letting a little bit of air out of the tube sections 26. This air will escape to atmosphere through holes in the disc 36. The disc 36 could be replaced with a magnetically deflecting diaphragm that was biased to a valve closed position. By holding the electromagnet energized for the desired length of time, the desired amount of air can be permitted to escape from the tube sections 26 so that the studs can be extended the desired amount before the switch 41 is again opened. This can be done by the operator of the automobile simply by pushing a switch on the dash. Note that while only one magnet is shown, there would be one for each of the tires having the retractable studs.

Of course the spring 37 has to be sufficiently strong so that the poppet valve will seal the tube sections 26 during normal operation, even when the desired amount of pressure is being carried in the tube sections 26, and yet balanced enough so that the force from the electromagnet will cause proper actuation of the member 36.

If an electromagnetic valve such as that shown schematically in FIG. 4 is utilized, a separate conventional air inflation valve 30 can be utilized for filling the hoses and retracting the studs after they have once been extended. Alternately, as shown, the center 43 of the poppet support stem can be formed as a conventional tire valve to permit inflation, and also deflation manually. The end of the valve protrudes beyond disc 36 so it is accessible for use.

Figure 5:
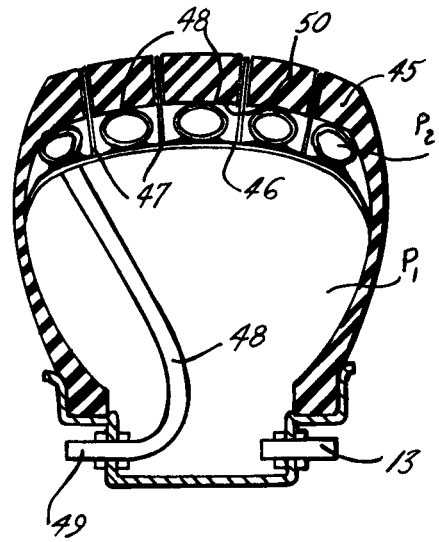
FIG. 5 is a sectional view of a tire showing a modified form of the present invention installed therein where individual studs are used.
Figure 6:
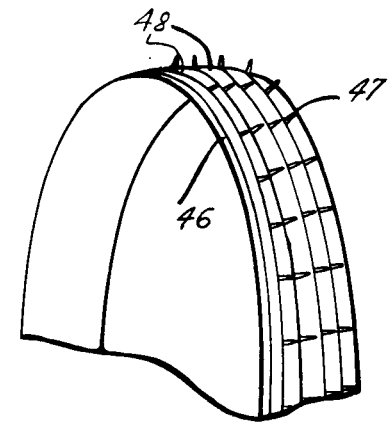
FIG. 6 is a fragmentary perspective view of the interior structure of the tire of FIG. 5.

A modified form of the invention is shown in FIG. 5 and 6, but the general principle still is the same. However, in this form of the invention the tire 45 is mounted again onto a rim and has a suitable air inflation valve 13 for inflating the interior of the tire, and has a tread wall as in the previous form of the invention. However in this form a deflectable barrier wall or bladder member 46 is sealingly vulcanized along the side walls of the tire into two sections, and is utilized for embedding the heads of individual studs 47 that are arranged in annular rows around a tire as shown or can be positioned as desired. Between the rows of studs 47, there are positioned flexible air tight tube sections 48 which are fluidly connected together with suitable cross passages on which can be a continuous tube wound in a spiral and offset between each of the annular rows of studs 47. The tube sections 48 can be vulcanized into the bladder or barrier wall if desired. The tube formed from the tube sections 48 is closed at one end and includes an extension coming down through the interior of the tire sealingly passing through the barrier wall 46 and carried out through the rim supporting tire. A tire valve 49 of conventional design controls fluid passage to the interior of the tube sections. The tube sections 48 can be inflated, and when the tube sections are inflated to a pressure greater than the pressure inside the main part of the tire 45, the barrier wall 46 will be deflected away from the interior surface 50 of the tread wall of the tire to position shown in FIG. 5, and the studs 47 are retracted. By deflating the tube sections 48, again, the interior tire pressure against the inside of the barrier wall will force the barrier wall 46 up against the surface 50 and the studs would thus be extended to position as shown in dotted lines.

In FIG. 6, the barrier wall 46 is shown removed from the tire casing in perspective view to show the plurality of studs 47 extending therethrough in annular rows. The studs extend through provided apertures in the treads of a tire for extension or retraction through the use of an inflatable and deflatable tube section between the interior surface of the tread portion of the tire and the barrier wall to control movement of the barrier wall in and out and thus control movement of the studs in and out. Also, in this form the barrier wall is flexible but somewhat stiff or rigid to give adequate force on the studs, but still be able to move as needed without changing the tire casing cross sectional shape.

It should be noted that the openings 21 for the legs 22, and the openings for the studs 47 permit air to bleed past the studs, so that the barrier walls will move relative to the interior surface of the tire, and no vacuum will be created and no problems with deflation of the tube sections used for controlling the studs will be encountered. The barrier walls in both embodiments seal the normal interior space for tire inflation.

In both forms of the invention the operation of the studs is fail-safe, meaning that the studs are extended whenever the tube sections controlling the studs will leak or be deflated for any reason. Studs can be extended any place as soon as they are needed because deflation is the method of extension of the studs. The stud extension distance can be changed by controlling the differential between the interior tire pressure ($P_1$), and the control tube pressure ($P_2$). The extension force is achieved by the use of the internal tire pressure against the relatively stiff internal barrier wall which will force the studs outwardly. The barrier wall is flexible enough for movement but has some stiffness to give a sufficient force to extend the studs and hold the studs in extended working position even when supporting an automobile.

The volume of air in the tubular sections relative to the total volume of air in the tire is very small. Thus inflating or deflating the tube sections does not affect the tire inflation pressure to any substantial degree.

What is claimed is:

1. In combination, a vehicle, a wheel rotatably mounted on said vehicle, a tire mounted on said wheel and holding interior inflation pressure in an interior tire chamber, said tire comprising a casing with side walls and a road engaging wall having a road engaging surface and an interior surface, a deflectable barrier wall sealingly dividing said interior tire chamber from the interior surface of said road engaging wall, a plurality of traction stud means slidably mounted through said road engaging wall, means to mount said stud means to be movable with said barrier wall from an extended position wherein said stud means extend outwardly beyond the road engaging surface of said tire to a retracted position, tubular expandable inflatable means acting between the interior surface of said road engaging wall and said barrier wall to control movement of said barrier wall and said stud means with respect to said road engaging wall in response to pressure differentials between said tubular expandable inflatable means and the interior tire chamber, and electromagnetically actuated valve means for relieving pressure in said tubular, expandable inflatable means, an electromagnet mounted on said vehicle adjacent the path of movement of said tire, and remote switch means for actuating said electromagnet to operate said valve to relieve pressure in said tubular inflatable means.

2. In combination, a vehicle, a wheel rotatably mounted with respect to said vehicle, and a tire having a casing with a tread wall having an outer surface and mounted onto said wheel and holding inflation pressure, a barrier wall sealed to the interior of said casing to form a tire inflation chamber and a second chamber adjacent the tread wall of said tire, said barrier wall being unattached with respect to the interior of said tire in at least certain portions adjacent said tread wall and being deflectable in at least some of said unattached portions, a plurality of stud means mounted to said barrier wall, said stud means extending through openings provided in said tread wall, and separate inflatable means between said barrier wall and an interior surface of the tread wall of said tire, in at least some of the unattached portions of said barrier wall, said separate inflatable means being capable of being inflated to a size sufficient to deflect portions of said barrier wall away from said tread wall against the inflation pressure in the inflation chamber to retract stud means carried by said barrier wall so that said stud means do not protrude beyond the outer surface of said tread wall, said separate inflatable means being deflatable to a position wherein said stud means will extend outwardly beyond the outer surface of the tread wall of the tire, and valve means for said separate inflatable means located adjacent a side wall of said tire, said valve means including an element movable under magnetic force to a deflation position wherein it will permit air to escape from said inflatable means, and electromagnet means mounted on said vehicle adjacent to said tire and positioned to create a flux capable of actuating said valve means to a deflation position, said electromagnet being controllable by an operator of said vehicle.

3. The combination as specified in claim 2 wherein said separate inflatable means comprise tubular members between the barrier wall and the interior of the tread wall of the tire said tubular members being positioned closely adjacent the stud means and all tubular members being in fluid communication.

4. The combination as specified in claim 3 wherein said stud means comprise staple type studs having a pair of legs and a base member, said base members being attached to said barrier wall, and said tubular members passing between the legs of each of the staple type studs.

* * * * *